Dec. 16, 1958     M. H. SHACKELFORD     2,864,758
NEUTRONIC REACTOR FUEL ELEMENT
Filed March 17, 1954
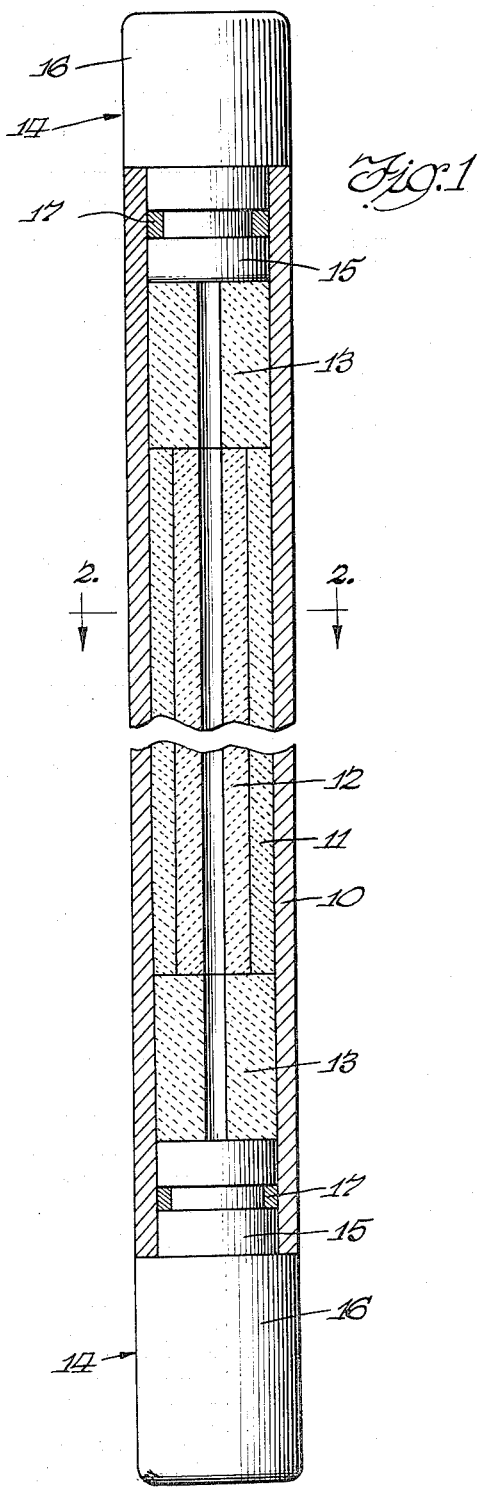
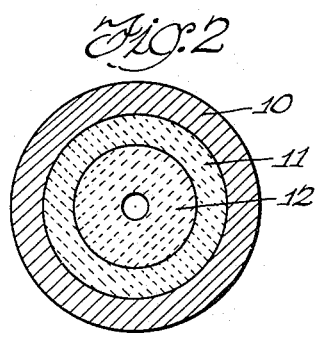
INVENTOR.
Milton H. Shackelford
BY
Roland A. Anderson
Atty.

United States Patent Office 2,864,758
Patented Dec. 16, 1958

2,864,758

NEUTRONIC REACTOR FUEL ELEMENT

Milton H. Shackelford, Schenectady, N. Y., assignor to the United States of America as represented by the United States Atomic Energy Commission Application March 17, 1954, Serial No. 416,969

4 Claims. (Cl. 204—193.2)

The present invention relates to a fuel element of the type that is employed in a neutronic reactor, and more particularly, to a fuel element having fissionable material sealed within a casing.

It is well known that the fission in a neutronic reactor produces very large quantities of heat, so that the materials of the reactor must be able to withstand high temperatures and the heat developed must be removed as efficiently and completely as possible.

An object of the present invention is to produce a fuel element in which the fissionable material stays solid at the high temperatures of fission and is held in good heat-conducting relation with the outer casing and space is provided within the casing to accommodate fission-product gases.

Other objects will appear from the disclosure.

Fig. 1 is a longitudinal section through the improved fuel element of the present invention; and Fig. 2 is a transverse section taken on the line 2—2 of Fig. 1.

The fuel element of the present invention includes a container or outer tube 10 which is 28 inches long and has an outer diameter of .080 inch and an inner diameter of .060 inch. The outer tube should be corrosion-resistant and have high heat conductivity and low neutron-capture cross section and so may be formed of stainless steel, V, Ti, Mo or Zr.

Within the outer tube 10 is a fuel tube 11 which is 27.250 inches long and has an internal diameter of .040 inch and an external diameter of .060 inch. The fuel tube contains an oxide of an isotope that is fissionable by neutrons of thermal energy, such as $U^{235}$, $U^{233}$, and $Pu^{239}$. These oxides may be pure oxides or may be oxides enriched with such isotopes, for example, $UO_2$ in which about 93% of the uranium content is $U^{235}$.

Within the fuel tube 11 is a hollow perforated or porous core 12, which is formed of MgO, BeO, $ZrO_2$, spinels, or other refractory material. The core is 27.250 inches long and has an inner diameter of .010 inch and an outer diameter of .040 inch. Abutting each end of the fuel tube 11 and the core 12 is a heat-barrier ring 13, which is formed of any of the materials listed above for core 12 and has a length of .25 inch, an inner diameter of .010 inch, and an outer diameter of .060 inch.

Fitting within each end of the outer tube 10 is an adaptor plug 14 which may be formed of any of the materials listed above for the outer tube 10 and which has a reduced portion 15 fitting within the end of the tube 10 and a larger exterior portion 16 abutting the end of the tube 10. The reduced portion 15 is .125 inch long and .060 inch in diameter, and has an annular groove in which is positioned a ring 17 which is a brazing wire composed 40% by weight of nickel and 60% by weight of manganese and bonds each end of the tube 10 to the reduced portion 15, thereby sealing the tube 10.

The foregoing specific dimensions have been given merely for the purpose of specific illustration in connection with the reactor disclosed and claimed in copending application of Henry Hurwitz Jr. et al., Serial No. 408,628, filed February 5, 1954, and wide variation may be made in these dimensions in connection with their use for other reactors.

The fuel tube 11 may be produced from a uranium ingot, 3 inches wide, 5 inches long, and .25 inch thick, which is reduced to a strip by hot and cold rolling. The strip is etched in a concentrated sulfuric acid bath, which brings it to the desired weight and produces passivity of the surface. Thereupon, the strip is slit in a conventional roll slitter and drawn on a mandril through a long-bearing wire-drawing die, which partially forms the strip into tubing. Next the partially formed tubing is placed on a mandril and swaged to a completed tubular shape that has abutting edges and dimensions that permit the uranium to fit between the outer tube 10 and the core 12. The fit of the uranium inner tube in the annular spacing .010 inch thick between the outer tube and the core need not be extremely tight, because the uranium tube will grow when it is subsequently converted to uranium oxide. There should be no overlapping of the abutting edges of the uranium tube, because overlapping may result in high local concentration of fuel in the finished fuel element.

Now the assembly of outer tube, inner tube, and hollow core is purged with helium at room temperature for about half an hour. This operation assures that no air is present in the assembly. If present, oxygen would oxidize the uranium of the inner tube in the steam reaction step to a higher oxide than the dioxide, which is the desired form. After being purged with helium, the assembly is heated to about 300° C. by being placed in a furnace at this temperature, in order that the steam soon to be supplied for oxidizing the uranium will not combine with the magnesium oxide of the core 12 to form magnesium hydroxide which is impervious to steam and thus would prevent proper oxidation of the uranium. Purging with helium is continued for about half an hour after the assembly has reached about 300° C.

Now the assembly is maintained at about 300–390° C., and preferably at about 300° C., and steam is passed through the core 12 at about 5 p. s. i. g. When the temperature is 300° C. the time of steam treatment is 5 hours. Because the core 12 is porous or foraminous, the steam goes radially outwardly through the core to the metal tube, which it converts to the fuel tube 11 by converting the uranium metal to $UO_2$. It is desirable that the steam be formed from deionized water, because the carbonates in tap water would break down and make the steam have an increased concentration of carbon dioxide, which combines with the magnesia of the core 12 to form magnesium carbonate. The latter breaks down and releases carbon dioxide when the fuel element is raised to above 300° C. as in use, with the result that the amount of carbon dioxide released in the fuel element would bring an undesirable increase in pressure in the fuel element in use.

After oxidation of the inner metal tube with steam to form the fuel tube 11, all of the residual steam must be removed from the assembly, and this is carried out by helium purging for about half an hour at about 300° C. and for about 16 hours during cooling of the assembly to room temperature.

Next the assembly is heated to about 450° C. and held at this temperature for about 16 hours while a vacuum is maintained about the assembly. In this manner volatile constituents are released which would increase the internal pressure in the fuel element during use and thereby decrease the life of the fuel element. Thereafter helium is again applied to the assembly, and the assembly is kept in a dried helium atmosphere until it is sealed. The sealing involves brazing or bonding of the adaptors or plugs 14 to the interiors of the end portions of the outer tube 10 in a helium atmosphere by means of the rings 17, which are heated so as to flow and alloy with the outer tube 10 and the reduced portions 15 of the adaptors 14.

The fuel tube 11 fits very tightly between the outer tube 10 and the core 12, because growth has occurred in the conversion of uranium to $UO_2$.

The fuel element may be employed in an assembly of the kind shown and claimed in the application of Henry Hurwitz, Jr., et al. mentioned above.

The fuel element of the present invention may also be formed by a process in which the fuel tube 11 is formed by tamp-packing of powder or small pieces of $UO_2$ in the space between the outer tube 10 and the core 12. With this process the core need not have a hollow central passage, although this passage provides additional room for fission-product gases beyond what the pores or foraminations in the core provide.

The fuel element of the present invention will maintain, for a given power level of a reactor, a lower temperature in the fuel element than is possible with a fuel element containing a heterogeneous mixture of $UO_2$ or other oxide of fissionable isotope and the refractory such as MgO.

It will be understood that this invention is not to be limited to the details given herein but that it may be modified within the scope of the appended claims.

What is claimed is:

1. A fuel element comprising an outer tube formed of material selected from the group consisting of stainless steel, V, Ti, Mo, and Zr, a fuel tube concentrically fitting within the outer tube and containing an oxide of an isotope selected from the group consisting of $U^{235}$, $U^{233}$, and $Pu^{239}$, and a porous core concentrically fitting within the fuel tube and formed of an oxide of an element selected from the group consisting of Mg, Be, and Zr.

2. A fuel element comprising a stainless-steel outer tube, a fuel tube concentrically fitting within the outer tube and composed of $UO_2$ in which about 93% of the uranium content is $U^{235}$, and a hollow MgO core concentrically fitting within the fuel tube.

3. The fuel element specified in claim 2 and further comprising MgO heat-barrier rings fitting within the ends of the outer tube in abutment with the ends of the fuel tube and the core and stainless-steel adaptors having relatively small portions fitting within the ends of the outer tube and bonded to the interior of said ends and relatively large portions abutting said ends and projecting exteriorly thereof, the core being porous.

4. A fuel element comprising an outer tube formed of a corrosion-resistant material having high heat conductivity and low neutron-capture cross section, a fuel tube concentrically fitting within the outer tube and containing an oxide of an isotope fissionable by neutrons of thermal energy, and a porous core concentrically fitting within the fuel tube and formed of an oxide of an element selected from the group consisting of Mg, Be, and Zr.

References Cited in the file of this patent

UNITED STATES PATENTS

| | | |
|---|---|---|
| 377,316 | Marshall | Jan. 31, 1888 |
| 1,889,105 | Parker | Nov. 29, 1932 |
| 2,482,178 | Harris et al. | Sept. 20, 1949 |

OTHER REFERENCES

Nucleonics, December 1949, pp. 41, 45, 46 (article by Ohlinger).